United States Patent [19]

Schilla et al.

[11] Patent Number: 4,615,554

[45] Date of Patent: Oct. 7, 1986

[54] SCREW-IN FASTENER FOR A TUBULAR ANCHOR EMBEDDED IN A CONCRETE ELEMENT

[75] Inventors: Henning Schilla, Essen-Frintrop; Ernst Hatz, Darmstadt; Eckart Zipf, Schlüchtern, all of Fed. Rep. of Germany

[73] Assignee: Deha Baubedarf GmbH & Co. KG, Gross-Gerau, Fed. Rep. of Germany

[21] Appl. No.: 626,624

[22] Filed: Jul. 2, 1984

[30] Foreign Application Priority Data

Jul. 27, 1983 [DE] Fed. Rep. of Germany ... 8321596[U]

[51] Int. Cl.4 .......................... B66C 1/00; F16B 23/00

[52] U.S. Cl. ...................................... 294/89; 411/400; 411/407; 52/125.5; 52/698; 52/704

[58] Field of Search ............... 411/258, 368, 369, 378, 411/383, 396, 397, 400, 401, 407, 485; 294/89; 52/125.5, 698, 699; 248/74.1, 74.4, 74.5; 16/121, 127; 24/297

[56] References Cited

U.S. PATENT DOCUMENTS

| | | | |
|---|---|---|---|
| 2,600,974 | 6/1952 | Crawford | 411/401 |
| 3,029,486 | 4/1962 | Raymond | 24/297 |
| 3,305,995 | 2/1967 | Armstrong et al. | 411/368 |
| 3,883,170 | 5/1975 | Fricker et al. | 294/89 |
| 4,091,708 | 5/1978 | Jacobson | 411/407 |
| 4,173,367 | 11/1979 | Haeussler | 294/89 |

FOREIGN PATENT DOCUMENTS

| | | | |
|---|---|---|---|
| 6908100 | 2/1969 | Fed. Rep. of Germany . | |
| 1913912 | 10/1970 | Fed. Rep. of Germany . | |
| 1684278 | 10/1971 | Fed. Rep. of Germany . | |
| 2304040 | 8/1974 | Fed. Rep. of Germany | 52/125.5 |
| 3009789 | 9/1981 | Fed. Rep. of Germany . | |
| 8207185.3 | 9/1982 | Fed. Rep. of Germany . | |

*Primary Examiner*—Thomas J. Holko
*Assistant Examiner*—Neill Wilson
*Attorney, Agent, or Firm*—Michael J. Striker

[57] ABSTRACT

A screw-in fastener for an anchor embedded in a precast concrete element includes a coupling member, to which a transport anchor is applied, a threaded pin insertable into the anchor positioned within the concrete element, and a supporting plate, from which the pin outwardly extends. The supporting plate has a circular end face supported against the upper surface of the concrete element.

10 Claims, 4 Drawing Figures

SCREW-IN FASTENER FOR A TUBULAR ANCHOR EMBEDDED IN A CONCRETE ELEMENT

BACKGROUND OF THE INVENTION

The present invention relates to screw-in fasteners which are inserted into threaded sleeves of the anchors embedded in precast concrete elements.

The tubular anchors provided with threaded sleeves, which are embedded in precast concrete elements, serve for fixing precast concrete elements to structural parts of lifting or hoisting equipment during the transportation and handling of those parts. A screw-in fastener for connecting concrete elements with a hoisting unit has been disclosed, for example in German patent publication DE-OS No. 19 13 912. The disclosed fastener includes a rope sling provided with a threaded pin. Hooks of the rope or the chain of the hoisting apparatus can hang on the rope sling.

Precast concrete elements must be usually fixed to the hoisting unit at relatively long intervals at the manufacturing plant. In many instances the fastener provided with the rope sling is screwed-in and released from the concrete element again and again, which leads to considerable labor consumption. Moreover, there is a danger that the inner thread of the sleeve of the anchor embedded in the concrete element would be contaminated.

In order to avoid the above disadvantages it has been proposed to place the fastener provided with a rope sling in the tubular anchor at least within the manufacturing plant and an eventual interpositioning. However, a comparatively great number of such fasteners have been required. But such fasteners are not suitable for a diagonal pull because of the force-in connection of the rope slings to the threaded pins, so that the carrying capacity of the fasteners during the diagonal pull decreases depending on the angle of application of the pulling force.

Anchor heads with improved diagonal pull-capacities have been also known. Such an anchor head has been described in German patent publication DE-OS No. 30 09 789. With such a construction the decrease of loads during the diagonal pull has been also required because the application of the pulling force in this case takes place only via the threaded pin.

The German patent DE-PS No. 1,684,278 teaches a transport anchor which can be connected to an anchor embedded in a concrete element in a substantially quicker and simpler manner than in the case of screw-in fasteners. These transport anchors have claws which are engaged with the head of the anchor embedded in the concrete element. The construction of the anchor embedded in a concrete element is described, for example, in DE-GM No. 82 07 185. The multiple securing and releasing of this transport anchor causes no substantial labor consumption; furthermore such transport anchors permit a diagonal pull without, however significantly decreasing a carrying capacity because the transport anchor is laterally supported on the wall of the recess provided in the precast concrete element. The advantage of the tubular anchor, as compared to the arrangement including a ball-shaped head embedded in concrete and a transport anchor with a large recess in concrete, is that the tubular anchor can be also inserted in thin plates and very slender steel concrete elements.

SUMMARY OF THE INVENTION

It is an object of the present invention to provide an improved screw-in fastener.

It is another object of the present invention to provide a screw-in fastener which would make possible a quick and simple connection of the tubular anchor embedded in a concrete element to the transport anchor and at the same time would ensure a satisfactory carrying capacity of the fastener during the diagonal pull.

These and other objects of the invention are attained by a screw-in fastener for a tubular anchor embedded in a precast concrete element, comprising a threaded pin screwable into said tubular anchor; a supporting plate having an underside, from which said threaded pin extends outwardly, said supporting plate having a supporting face extended normally to said pin and concentrically surrounding the latter, said supporting face being supported on said concrete element when said pin is screwed in said anchor, said supporting plate having an upper side and being formed at said upper side with a recess; and a coupling member for coupling the fastener with a transport anchor, said coupling member being positioned in said recess.

The screw-in fastener is screwed in the tubular anchor embedded in the concrete element only one time for all transporting operations and intermediate process steps so that labor consumption with such a fastener is very insignificant. A further advantage of this construction is that with a small volume of the recess provided in the concrete element a transport anchor can be utilized, which can be connected to the coupling member by a simple hanging.

The supporting plate may have an additional supporting face, said additional supporting face being parallel to and concentrical with said first mentioned supporting face, said additional supporting face being spaced relative to said first mentioned supporting face along an axis of said supporting plate and in the direction away from said pin.

The recess in the supporting plate may have a spherical shape.

The coupling member may include a shaft portion and an enlarged head connected to the shaft portion so that the claws of the transport anchor can engage behind that head.

The coupling member may be a shackle extended perpendicularly to the supporting plate and having a transversal bore so that a hook-shaped transport anchor can be used, which could be easily connected to the fastener and thus to the concrete element or released therefrom.

Due to the provision of the recess in the supporting plate and to the lateral support of the transport anchor in this recess a comparatively high diagonal pull-load capacity is not reduced by the screw-in connection of the fastener with the threaded sleeve of the tubular anchor embedded in the concrete element because this connection causes a very insignificant bending. The torque generated by the diagonal pull of the fastener is taken up by a pulling force acting in the direction of elongation of the tubular anchor and by a compression force acting at a distance from and parallel to the pulling force between the supporting face of the supporting plate and the upper surface of the concrete element.

Since the construction of the screw-in fastener according to the present invention is comparatively simple and it is preferably formed as a one-piece rotatable element the costs of the manufacture of such fastener are insignificant so that they can be made in mass production. Inasmuch as the screw-in fastener of this invention is not screwed out from the tubular anchor of the concrete element during numerous transporting steps and various intermediate positionings, there is no danger that the threads of the anchor sleeves would be contaminated.

Because one supporting face provided on the supporting plate is axially offset relative to the additional supporting face on the underside of the supporting plate the portion of the supporting plate formed between those supporting faces is inserted into a recess formed in the concrete element, whereby the outer face of the supporting plate or the face, which is remote from the tubular sleeve of the anchor embedded in the concrete element, lies against the upper surface of the concrete element. Therefore, a smooth and snug arrangement of the screw-in fastener on the concrete element is provided. The additional supporting face of supporting plate is supported against the wall which forms the recess of the concrete element.

The screw-in fastener according to the present invention forms an adaptor which enables a fast and simple connection between a very simple tubular anchor embedded in the concrete element and a transporting anchor which can be readily applied to or released from the fastener. Such a transporting anchor is disclosed, for example, in DE-GM No. 69 08 100 and is provided with a hook or eyelet; such an anchor has been screwed on the outer thread of the elongated anchor embedded in the concrete element. During the diagonal pull of the fastener the latter is supported on the conical surface formed by the peripheral wall of the recess in the concrete element, which surface takes up comparatively high loads. Manufacturing inaccuracies cause bending loads on the end of the anchor embedded in the concrete element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
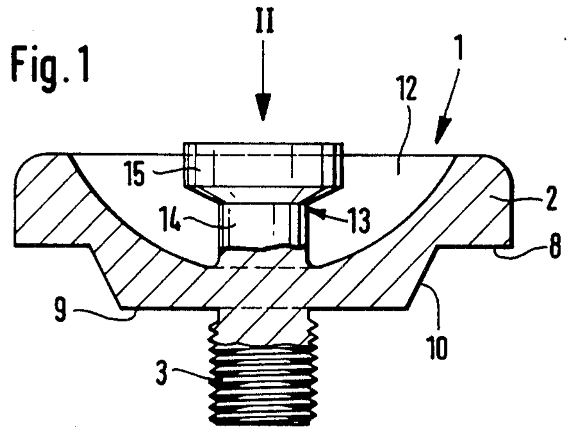
FIG. 1 is a partial axial sectional view through a screw-in fastener according to the present invention.
Figure 2:
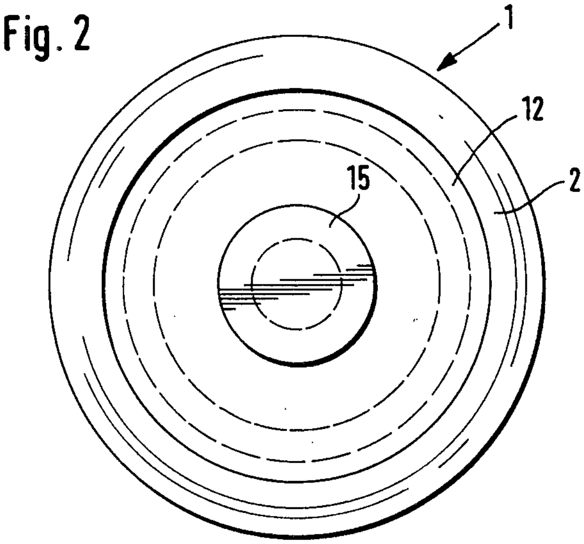
FIG. 2 is a top plan view seen from arrow 11 of FIG. 1.
Figure 3:
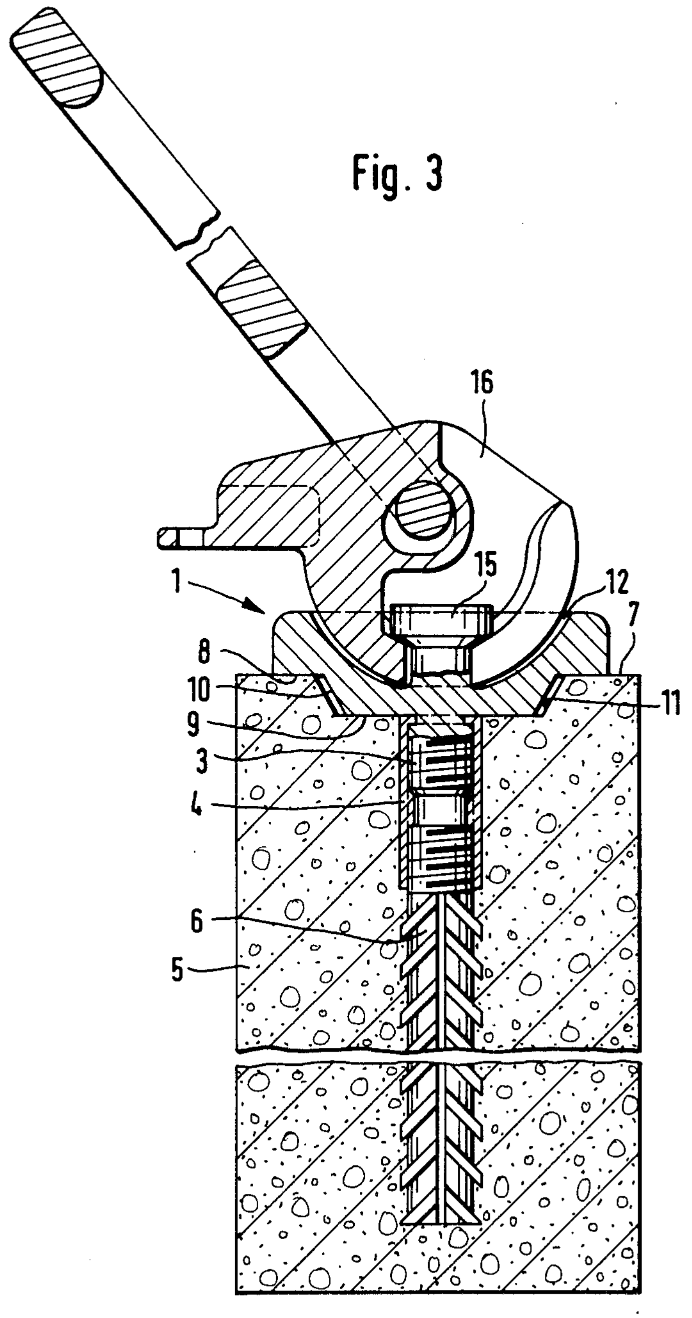
FIG. 3 is a sectional view through the screw-in fastener of FIG. 1 in the inserted condition in a precast concrete element, with a claw-shaped coupling member applied to the fastener.

Referring now to the drawings in detail, and first to FIGS. 1 and 2 thereof, it will be seen that a screw-in fastener 1 includes a substantially circular supporting plate 2 having an underside 9 from which a threaded pin 3 extends outwardly. With reference to FIG. 3 it is seen that threaded pin 3 is screwed into the inner thread of a sleeve 4, a portion of which is formed by a tubular anchor 6 embedded in a precast concrete structure 5. In the preferred embodiment tubular sleeve 6 is a portion of the bar-wound armature provided with ribs on the surface thereof.

Tubular anchor 6 is inserted in concrete structure 5 relative to the outer surface 7 of concrete structure. Supporting plate 2 has a circular outer supporting surface 8 on the underside and the aforementioned circular inner supporting surface 9 which is parallel to and concentrical with the outer supporting surface 8. Surfaces 8 and 9 are connected to each other by a conical portion 10. The outer supporting surface 8 is axially offset relative to the inner supporting surface 9 in the direction from pin 3. The portion 10 of plate 2, limited by the inner supporting surface 9 in the screwed-in condition of pin 4 into threaded sleeve 4, extends into and lies within a depression 11 surrounding sleeve 4 and provided in the outer surface of concrete structure 5 whereas the outer supporting surface 8 abuts against the outer surface 7 of the concrete structure.

A recess 12, preferably formed as a spherical indentation or calotte, is provided on the upper side of supporting plate 2. An anchor coupling member 13 outwardly extended from supporting plate 2 is centrally arranged in recess 12. Coupling member 13 includes a shaft portion 14 and an enlarged head portion 15. Head 15 can be engaged from behind by a carrier or transport anchor 16 in a claw-like manner so that the precast concrete element 5 can be lifted. During a diagonal pull the spherical surface of carrier anchor 16 abuts against the wall of recess 12. Carrier anchor 16 is rotatable at all sides relative to the fastener 1 so that the forces acting on the fastener in all directions can be taken up.

Figure 4:
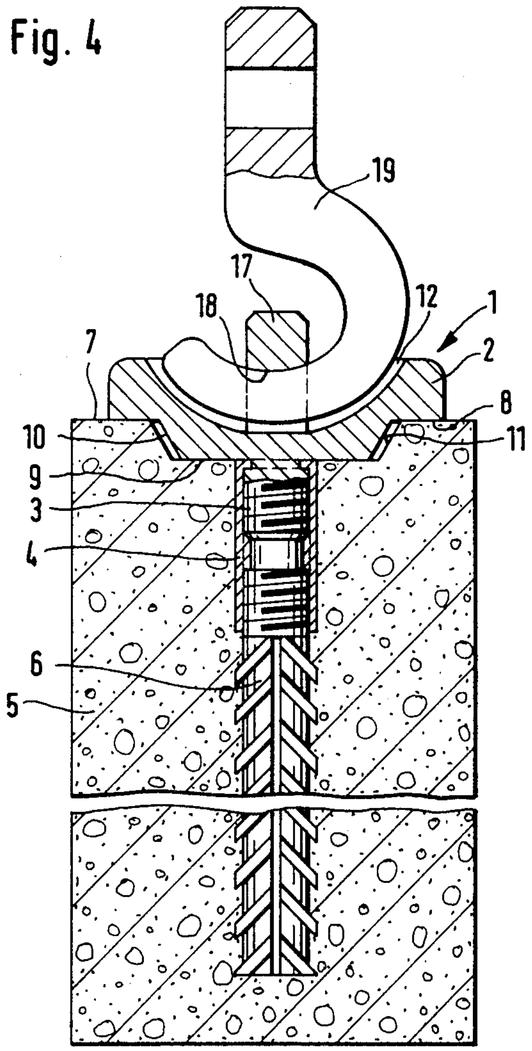
FIG. 4 is a sectional view through a screw-in fastener in the inserted condition in a precast concrete element, with the coupling member of another embodiment of the invention.

In the embodiment of FIG. 4 sleeve 4 and tubular ribbed portion 6 are of the same constructions as those of FIG. 1. In place of coupling member 13 with head 15 in supporting plate 2, a chuckle 17 formed with a transversal bore 18 is provided in the recess 12 centrally thereof. Chuckle 17 also acts as a coupling member for coupling precast concrete element 5 with a carrier anchor 19, which has a hook inserted into bore 18 of chuckle 17, and is suspended on that chuckle.

It will be understood that each of the elements described above, or two or more together, may also find a useful application in other types of screw-in fasteners for anchors embedded in precast concrete elements.

While the invention has been illustrated and described as embodied in a screw-in fastener for anchors embedded in concrete elements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A screw-in fastener for a tubular anchor embedded in a precast concrete element having a first and a second supporting surface, comprising a threaded pin screwable into said tubular anchor; a supporting plate having an underside, from which said threaded pin extends outwardly, said supporting plate having a first supporting face extended normally to said pin and concentrically surrounding the latter, said supporting face being supported on said first supporting surface of said concrete element when said pin is screwed in said anchor, said supporting plate having an upper side and being formed at said upper side with a recess; and a coupling member for coupling the fastener with a transport anchor, said coupling member being positioned in said recess and connected to said supporting plate, said supporting plate having an additional supporting face, said additional supporting face being parallel to and concentrical with said first supporting face, said additional supporting face being offset relative to said first supporting face along an axis of said supporting plate and in the direction away from said pin, said additional supporting face abutting against said second supporting surface when said pin is screwed in said anchor.

2. The fastener as defined in claim 1, wherein said recess has a spherical shape to match a surface of the transport achor.

3. The fastener as defined in claim 2, wherein said coupling member includes a shaft portion and an enlarged head conected to the shaft portion.

4. The fastener as defined in claim 2, wherein said coupling member is a shackle extended perpendicularly to said supporting plate and having a transversal bore.

5. The fastener as defined in claim 2, wherein said pin, said supporting plate and said coupling member being an integral one-piece element.

6. In a combination of screw-in fastener inserted in a tubular anchor embedded in a precast concrete element having a recess, a first surface outside of said recess and a second surface provided at a bottom of said recess, the fastener comprising a threaded pin screwable into said tubular anchor; a supporting plate having an underside, from which said threaded pin extends outwardly, said supporting plate having a first supporting face extended normally to said pin and concentrically surrounding the latter, said supporting face being supported in assembly on said first surface of said concrete element when said pin is screwed in said anchor, said supporting plate having an upper side and being formed at said upper side with a recess; and a coupling member for coupling the fastener with a transport anchor, said coupling member being positioned in said recess of said supporting plate and connected to said supporting plate, said supporting plate having an additional supporting face, said additional supporting face being parallel to and concentrical with said first supporting face, said additional supporting face being offset relative to said first supporting face along an axis of said supporting plate and in the direction away from said pin, said additional supporting face abutting against said second surface in assembly.

7. The combination as defined in claim 6, wherein said recess has a spherical shape to match a surface of the transport anchor.

8. The combination as defined in claim 6, wherein said coupling member includes a shaft portion and an enlarged head connected to the shaft portion.

9. The combination as defined in claim 7, wherein said coupling member is a shackle extended perpendicularly to said supporting plate and having a transversal bore.

10. The fastener as defined in claim 6, wherein said pin, said supporting plate and said coupling member being an integral one-piece element.

* * * * *